United States Patent [19]

Cain et al.

[11] Patent Number: 5,301,079
[45] Date of Patent: Apr. 5, 1994

[54] CURRENT BIASED MAGNETORESISTIVE SPIN VALVE SENSOR

[75] Inventors: William C. Cain, San Jose, Calif.; Bernard Dieny, Grenoble Credex, France; Robert E. Fontana, Jr.; Virgil S. Speriosu, both of San Jose, Calif.

[73] Assignee: International Business Machines Corporation, Armonk, N.Y.

[21] Appl. No.: 977,382

[22] Filed: Nov. 17, 1992

[51] Int. Cl.⁵ .............................. G11B 5/30
[52] U.S. Cl. ................................. 360/113
[58] Field of Search .......................... 360/113

[56] References Cited

U.S. PATENT DOCUMENTS

| | | | |
|---|---|---|---|
| 4,833,560 | 5/1989 | Doyle | 360/113 |
| 4,949,039 | 8/1990 | Grunberg | 324/252 |
| 5,206,590 | 4/1993 | Dieny | 360/113 |

OTHER PUBLICATIONS

Thompson et al, IEEE . . . , "Thin Film Magnetoresistors in Memory, Storage, and Related Applications", Mag. 11, No. 4, Jul. 1975, pp. 1039–1050.
H. Suyama, et al, IEEE . . . , "Thin Film MR Head for High Density Rigid Disk Drive", IEEE Mag. #24, No. 6, Nov. 1988, pp. 2612–2614.

*Primary Examiner*—A. J. Heinz
*Attorney, Agent, or Firm*—Leslie G. Murray

[57] ABSTRACT

A magnetoresistive read sensor based on the spin valve effect in which a component of the read element resistance varies as the cosine of the angle between the magnetization directions in two adjacent magnetic layers is described. The sensor read element includes two adjacent ferromagnetic layers separated by a non-magnetic metallic layer, the magnetic easy axis of each of the ferromagnetic layers being aligned along the longitudinal axis of the ferromagnetic layers and perpendicular to the trackwidth of an adjacent magnetic storage medium. The sense current flowing in the sensor element generates a bias field which sets the direction of magnetization in each ferromagnetic layer at an equal, but opposite, angle $\theta$ with respect to the magnetic easy axis thus providing an angular separation of $2\theta$ in the absence of an applied magnetic signal. The magnetizations of both ferromagnetic layers are responsive to an applied magnetic field to change their angular separation by an amount $2\delta\theta$.

28 Claims, 2 Drawing Sheets

CURRENT BIASED MAGNETORESISTIVE SPIN VALVE SENSOR

BACKGROUND OF THE INVENTION

The present invention relates generally to magnetic transducers for reading information signals recorded in a magnetic medium and, more particularly, to an improved magnetoresistive read sensor which utilizes a multilayered, spin valve structure and the sensor sense current to set the non-signal operating point of the sensor.

The prior art discloses a magnetic read transducer referred to as a magnetoresistive (MR) sensor or head which has been shown to be capable of reading data from a magnetic surface at great linear densities. An MR sensor detects magnetic field signals through the resistance changes of a read element fabricated of a magnetic material as a function of the strength and direction of magnetic flux being sensed by the read element. These prior art MR sensors operate on the basis of the anisotropic magnetoresistive (AMR) effect in which a component of the read element resistance varies as the square of the cosine$^2$ (cos ) of the angle between the magnetization and the direction of sense current flow through the element. A more detailed description of the AMR effect can be found in "Memory, Storage, and Related Applications", D.A. Thompson et al., IEEE Trans. Mag. MAG-11, p. 1039 (1975).

U.S. Pat. No. 4,896,235 entitled "Magnetic Transducer Head Utilizing Magnetoresistance Effect", granted to Takino et al on Jan. 23, 1990, discloses a multilayered magnetic sensor which utilizes the AMR and comprises first and second magnetic layers separated by a non-magnetic layer in which at least one of the magnetic layers is of a material exhibiting the AMR effect. The easy axis of magnetization in each of the magnetic layers is set perpendicular to the applied magnetic signal such that the MR sensor element sensor current provides a magnetic field in the magnetic layers parallel to the easy axis thus eliminating or minimizing Barkhausen noise in the sensor. "Thin Film MR Head for High Density Rigid Disk Drive" by H. Suyama et al, IEEE Trans. Mag., Vol. 24, No. 6, 1988 (pages 2612–2614) discloses a multilayered MR sensor similar to that disclosed by Takino et al.

More recently, a different, more pronounced magnetoresistive effect has been described in which the change in resistance of a layered magnetic sensor is attributed to the spin-dependent transmission of the conduction electrons between the magnetic layers through a non-magnetic layer and the accompanying spin-dependent scattering at the layer interfaces and within the ferromagnetic layers. This magnetoresistive effect is variously referred to as the "giant magnetoresistive" or "spin valve" effect. Such a magnetoresistive sensor fabricated of the appropriate materials provides improved sensitivity and greater change in resistance than observed in sensors utilizing the AMR effect. In this type of MR sensor, the in-plane resistance between a pair of ferromagnetic layers separated by a non-magnetic layer varies as the cosine (cos) of the angle between the magnetization in the two layers.

U.S. Pat. No. 4,949,039 to Grunberg describes a layered magnetic structure which yields enhanced MR effects caused by antiparallel alignment of the magnetizations in the magnetic layers. As possible materials for use in the layered structure, Grunberg lists ferromagnetic transition metals and alloys, but does not indicate preferred materials from the list for superior MR signal amplitude. Grunberg further describes the use of antiferromagnetic-type exchange coupling to obtain the antiparallel alignment in which adjacent layers of ferromagnetic materials are separated by a thin interlayer of Cr or Y.

Co-pending U.S. patent application Ser. No. 07/625,343 filed Dec. 11, 1990, assigned to the instant assignee, discloses an MR sensor in which the resistance between two uncoupled ferromagnetic layers is observed to vary as the cosine of the angle between the magnetizations of the two layers and which is independent of the direction of current flow through the sensor. This mechanism produces a magnetoresistance that is based on the spin valve effect and, for selected combinations of materials, is greater in magnitude than the AMR.

Co-pending U.S. patent application Ser. No. 07/652,852, filed Feb. 8, 1991, assigned to the instant assignee, discloses an MR sensor based on the above-described effect which includes two thin film layers of ferromagnetic material separated by a thin film layer of a non-magnetic metallic material wherein at least one of the ferromagnetic layers is of cobalt or a cobalt alloy. The magnetization of the one ferromagnetic layer is maintained perpendicular to the magnetization of the other ferromagnetic layer at zero externally applied magnetic field by exchange coupling to an antiferromagnetic layer.

The spin valve structures described in the above-cited U.S. patent applications require that the direction of magnetization in one of the two ferromagnetic layers be fixed or "pinned" in a selected orientation such that under non-signal conditions the direction of magnetization in the other ferromagnetic layer is oriented perpendicular to the pinned layer magnetization. When an external magnetic signal is applied to the sensor, the direction of magnetization in the non-fixed or "free" layer rotates with respect to the direction of magnetization in the pinned layer. The output of the sensor then, is proportional to the cosine of the angle that the magnetization of the free layer rotates through. In order to maintain the magnetization orientation in the pinned layer, a means for fixing the direction of the magnetization is required. For example, as described in the above-cited patent applications, an additional layer of antiferromagnetic material can be formed in contact with the pinned ferromagnetic layer to provide an exchange coupled bias field. Alternatively, an adjacent magnetically hard layer can be utilized to provide hard bias for the pinned layer.

SUMMARY OF THE INVENTION

It is a principal object of the present invention to provide an MR sensor based on the spin valve effect in which it is not required to provide additional structure means for fixing the magnetization orientation in one or more of the ferromagnetic layers.

Another object of the present invention is to provide an MR sensor in which the magnetization in both ferromagnetic layers is responsive to an applied magnetic signal thus providing an increased measurement signal output.

These and other objects and advantages are attained in accordance with the principles of the present invention, in which an MR read sensor based on the spin valve effect comprises a layered structure formed on a suitable substrate including first and second thin film layers of a ferromagnetic material separated by a thin film layer of non-magnetic metallic material and which is biased at a desired non-signal point by the sensor sense current. The ferromagnetic layers are oriented with the preferred or easy magnetic axis perpendicular to the width of a data track on an adjacent storage medium and parallel to the direction of sense current through the sensor. When the sense current is applied to the sensor, the magnetic field associated with the sense current provides a bias field for each ferromagnetic layer such that the magnetization direction in each layer is oriented at equal and opposite angles with respect to the easy axis. The magnetization is not fixed in either of the ferromagnetic layers and, thus, is free to respond to an applied magnetic field. An applied magnetic signal will cause the magnetization direction in both ferromagnetic layers to rotate through substantially equal, but opposite angles with respect to the easy axis, thus having the effect of changing the angle between the magnetizations of the layers by twice as much when compared to a prior art spin valve MR sensor in which one of the ferromagnetic layers is pinned. A current source provides a sense current to the MR sensor which generates a voltage drop across the read element proportional to the variations in the resistance of the MR sensor due to the rotation of the magnetization in the layers of ferromagnetic material as a function of the applied external magnetic field being sensed. The magnitude of the resistance change of the read element is a function of the cosine of the change of the angle between the directions of magnetization in the layers in response to an externally applied magnetic field such as that representative of a data bit stored in magnetic media.

Thus, the present invention provides a spin valve MR sensor in which the magnetization in both ferromagnetic layers is free to respond to an applied signal and in which the sensor sense current biases the magnetization of both layers to the same, but opposite angle with respect to the easy axis. As the magnetization in both ferromagnetic layers is free to rotate, the requirement for a pinning means, such as an exchange bias layer or hard bias layer, is eliminated. Since both ferromagnetic layers are responsive to an applied magnetic signal, the sensitivity of the sensor is greatly increased. Additionally, since the materials typically utilized to provide exchange bias fields are relatively corrosive, elimination of one or more exchange bias layers exposed at the sensor air bearing surface greatly reduces the overall corrosion problem associated with fabrication and operation of the sensor.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
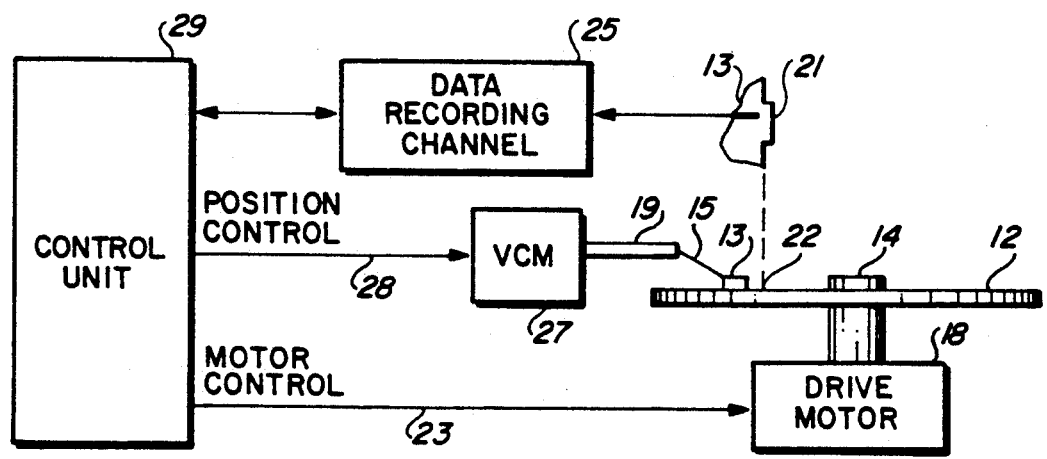
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
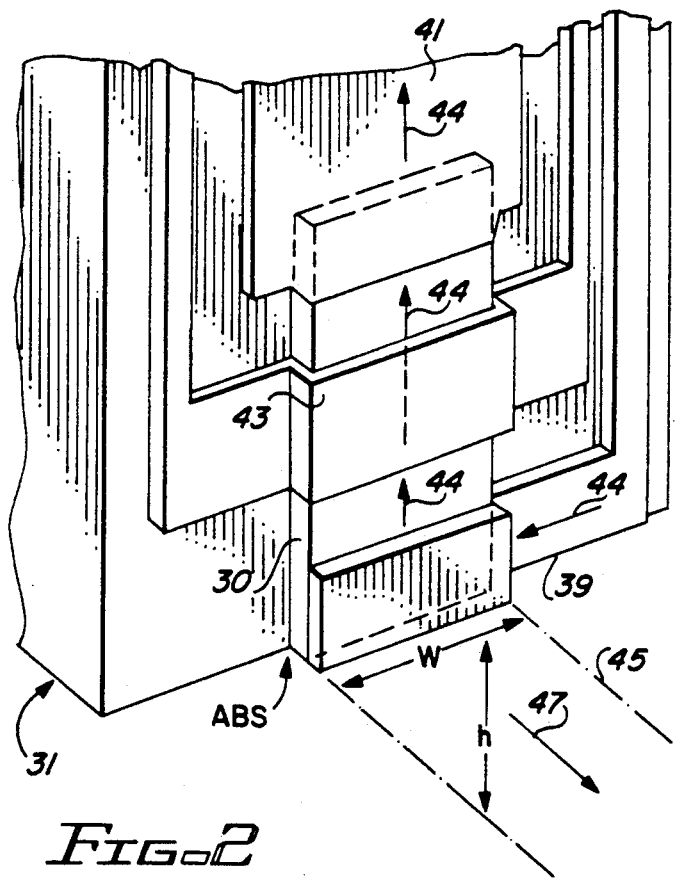
FIG. 2 is a view in perspective of a preferred embodiment of the magnetoresistive sensor according to the principles of the present invention.
Figure 3:
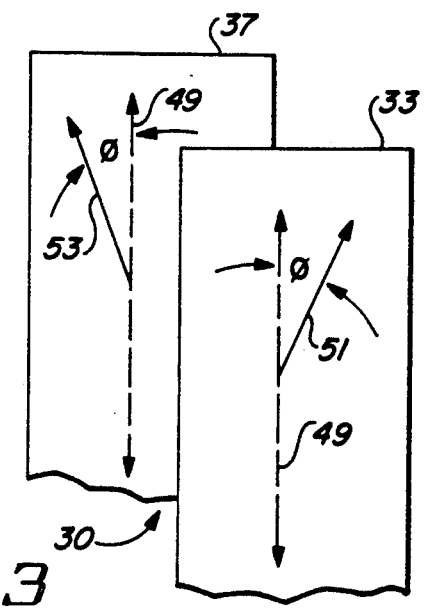
FIG. 3 is an exploded view in perspective illustrating the magnetic orientation for the magnetic layers the magnetoresistive sensor shown in FIG. 2.
Figure 4:
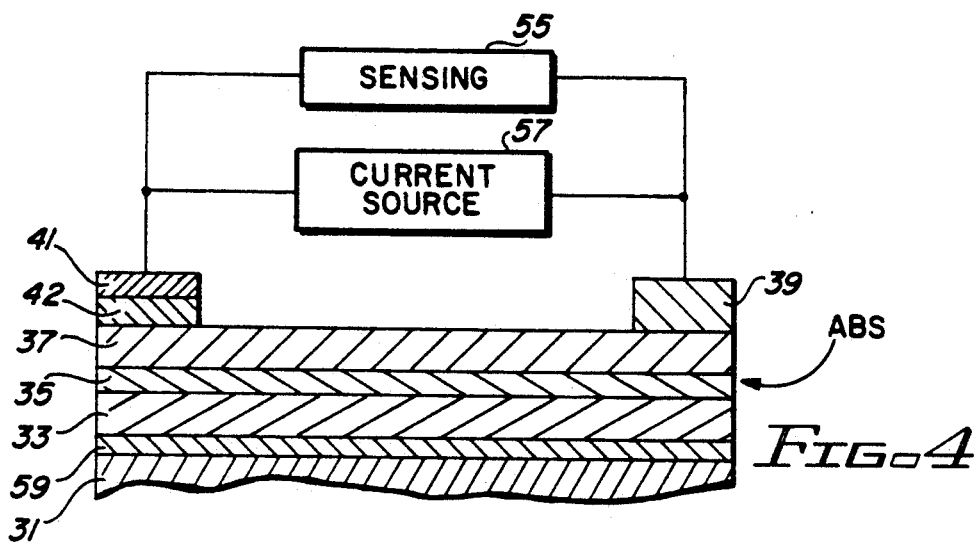
FIG. 4 is a sectional view of the preferred embodiment of the magnetoresistive sensor shown in FIG. 2.

Referring now to FIGS. 2, 3 and 4, an MR spin valve sensor according to the principles of the present invention comprises a first thin film layer 33 of magnetically soft ferromagnetic material, a thin film layer 35 of a non-magnetic metallic material and a second thin film layer 37 of magnetically soft ferromagnetic material to form an MR element 30 deposited on a suitable substrate 31 such as glass, ceramic or a semiconductor, for example. A bias conductor 43 is formed over the MR element 30 to provide a longitudinal bias field which ensures a single magnetic domain state in the active region of the magnetic layers 33, 37 to minimize Barkhausen noise. The bias conductor 43 is electrically isolated from the MR element 30 by an insulation layer of suitable material. The bias conductor is oriented with respect to the MR element 30 such that a current flow through the bias conductor generates a magnetic field in the MR element parallel to the magnetic easy axis. Electrical leads 39 and 41 of a suitable conductive material deposited over the end regions of the MR element 30 are provided to form a circuit path between the MR sensor and a current source 57 and a signal sensing means 55.

During fabrication, the magnetic easy axis, as indicated by dashed arrow 49, is set to be parallel to the MR element 30 longitudinal axis while the MR element 30 is physically arranged such that its longitudinal axis and, hence, the easy axis 49 for both ferromagnetic layers 33, 37 is oriented perpendicular to the width W of a data track 45 formed in a magnetic storage medium. In the absence of current flow through the MR element 30, the magnetizations of the two layers 33,37 of ferromagnetic material are oriented along the easy axis 49 and are parallel. When a sense current is applied to the MR element 30, as indicated by arrows 44, the magnetic field generated by sense current flowing in each of the ferromagnetic layers 33, 37, in combination with the current flow through the non-magnetic metallic spacer layer 35, provides a biasing field for the other ferromagnetic layer, respectively, as is well known in the art (see U.S. Pat. No. 4,833,560, for example), which rotates the magnetization in both layers 33, 37, as indicated by arrows 51, equal, but opposite angles $\theta$ with respect to the easy axis 49. Additionally, the magnetization in both the first and second layers 33, 37 of ferromagnetic material is free to rotate its direction in response to an externally applied magnetic field (such as magnetic field h as shown in FIG. 2). In response to an externally applied magnetic signal, the magnetization in each ferromagnetic layer 33, 37 will rotate through of an equal but opposite angle $\delta\theta$ thus providing a change in resistance of the MR element proportionally to $\cos(2\delta\theta)$. It is to be noted that while the direction of the current flow through the MR element 30 is important with respect to the setting of the non-signal operating point, the variation of resistance of the MR element 30 is independent of the direction of current flow therein and dependent only on the change in the angle between the magnetizations of the two ferromagnetic layers 33, 37 in response to an applied magnetic signal.

The ferromagnetic layers 33, 37 can be fabricated of any suitable magnetic material such as cobalt (Co), iron (Fe), nickel (Ni) and their alloys such as nickel-iron (NiFe), nickel-cobalt (NiCo) or iron-cobalt (FeCo), for example. The non-magnetic metallic spacer layer 35 comprises copper (Cu), for example, or other suitable noble metal such as silver (Ag) or gold (Au) or their alloys. The thickness of the metallic spacer layer 35 is sufficiently great to ensure substantial magnetic decoupling of the two ferromagnetic layers 33, 37 but still thin enough to be less than the mean free path length of the conduction electrons. An MR sensor based on the spin valve effect wherein the sensor read elements comprises the ferromagnetic/non-magnetic/ferromagnetic layered structure is described in greater detail in the above referenced patent application Ser. No. 07/625,343 hereby incorporated by reference as if fully set forth herein.

With continuing reference to FIG. 4, a side view in section of the preferred embodiment as shown in FIG. 2 taken along the longitudinal axis of the MR element 30 is shown. A suitable underlayer 59, such as Ta, Ru or CrV, for example, can be deposited on substrate 31 prior to the deposition of a first ferromagnetic layer 33. The purpose of underlayer 59 is to optimize the texture, grain size and morphology of the subsequent layers. The morphology can be crucial in obtaining the large MR effects characteristic of spin valve structures since it permits the use of a very thin nonmagnetic metallic spacer layer 35 between the two ferromagnetic layers 33 and 37. The underlayer 59 must also have a high resistivity to minimize electrical current shunting effects. Should the substrate 31 be of a material having a sufficiently high resistivity, have a sufficiently planar surface and have a suitable crystallographic structure, the underlayer 59 can be omitted.

A first thin film layer 33 of soft ferromagnetic material, a thin film layer 35 of a nonmagnetic metallic material and a second thin film layer 37 of a soft ferromagnetic material are deposited over underlayer 59. Electrical leads 39, 41 are provided to form a circuit path between the MR sensor and a current source 57 and a signal sensing means 55. As described above, the MR element 30 is physically oriented such that its longitudinal axis, and hence the magnetic easy axis, is perpendicular to the trackwidth W of a storage track formed in adjacent magnetic memory 12 (as shown in FIG. 1). Consequently, only one end, a lower end with respect to media 12, for example, is exposed at the sensor air bearing surface ABS with the read trackwidth being defined by the end width of the MR element exposed at the ABS. In order to reduce Barkhausen noise, a longitudinal bias layer 42 is deposited over one end of the MR element 30 remote from the ABS of the sensor. The bias layer can be of an antiferromagnetic material, such as manganese-iron or nickel-manganese, for example, deposited in direct contact with the end region of the ferromagnetic layers to provide a bias field by exchange coupling or can be magnetically hard layer to provide hard bias as is known in the art. Since the bias layer 42 is remote from the ABS, potentially corrosive material is not exposed at the ABS thereby minimizing the corrosion problems typically encountered when such materials are present at the ABS. Alternatively, as described with reference to FIG. 2, a bias conductor 42 can be formed over the MR element 30 separated therefrom by an insulting layer (not shown) of suitable material, such as silicon dioxide$_2$ (SiO ) or the like. A capping layer (not shown) of a high resistivity material such as Ta or Zr, for example, can also be deposited over the MR sensor.

As described above, the two ferromagnetic layers 33, 37 have their magnetizations oriented parallel both to the easy axis and with respect to each other in the absence of an applied sensor sense current. Additionally, the longitudinal bias field generated by the bias layer 42, or by the bias conductor 43, will be parallel to the easy axis. When the sense current is applied to the MR element 30, the magnetic field generated will be normal to the easy axis. Consequently, the resulting magnetization direction will be at an angle θ with respect to the easy axis as a function of the relative strengths of the different bias fields. Since the magnetization in each magnetic layer 33, 37 will be effected equally and opposite, the magnetizations in the two layers 33, 37 will be separated by an angle 2θ in the absence of an applied external magnetic field.

Figure 5:
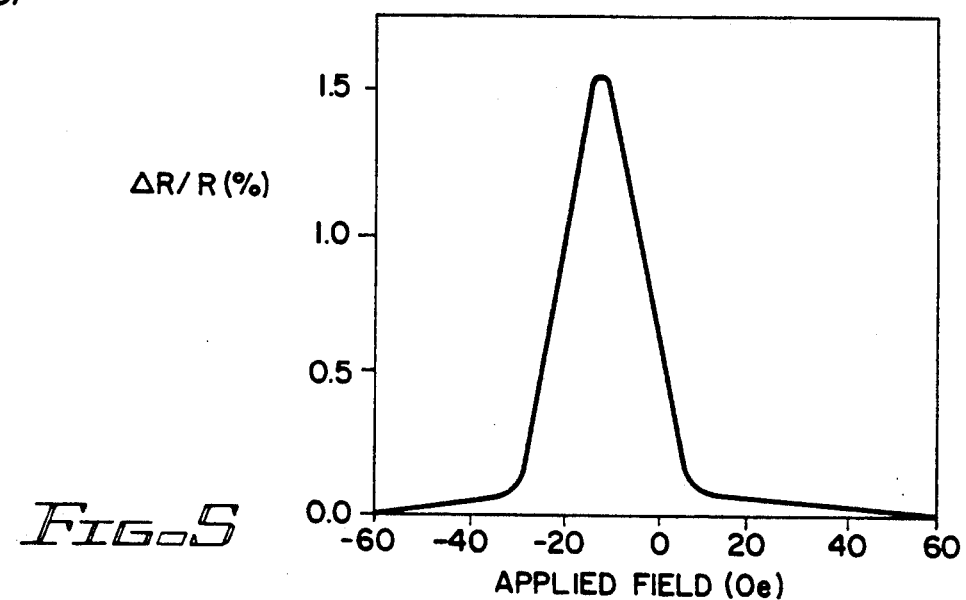
FIG. 5 is a graph which illustrates the magnetoresistance versus the applied magnetic signal for the magnetoresistive sensor shown in FIG. 2 with a longitudinal bias field applied.
Figure 6:
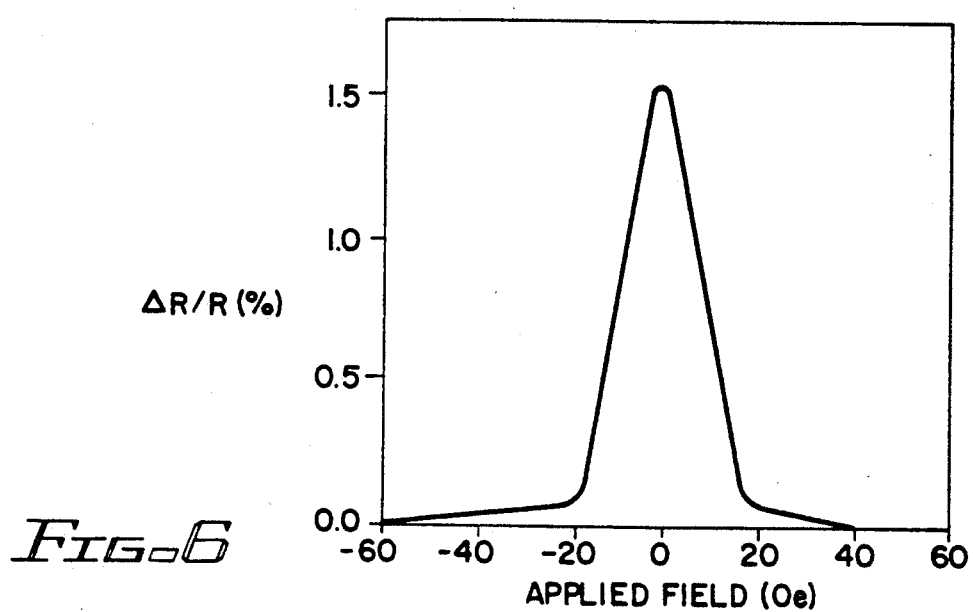
FIG. 6 is a graph which illustrates the magnetoresistance versus the applied magnetic signal for the magnetoresistive sensor shown in FIG. 2 with no longitudinal bias field applied.

As described above, the ferromagnetic layers 33, 37 can can be fabricated of any suitable magnetic material and have a thickness preferably selected from a range of about 10Å to about 150Å. The nonmagnetic spacer layer 45 is preferably metallic with high conductivity. Noble materials such as Au, Ag and Cu provide large MR response, Pt and Pd provide small MR response, while Cr and Ta exhibit very little MR response. The thickness of the spacer layer 45 is preferably within the range of about 10Å to about 40Å. Referring now also to FIGS. 5 and 6, the MR characteristic for the spin valve sensor of the present invention is illustrated for two bias conditions. The curves shown represent the MR characteristic where the relative resistance change is plotted as a function of a uniform applied magnetic field for an unshielded device when a sense current of 15 mA was applied to a sensing element comprised of two 50 Å thick NiFe layers separated by a 20 Å thick Cu nonmagnetic layer having a trackwidth of 4 micrometers (μm). FIG. 5 shows the results for a 10 Oe longitudinal bias field and FIG. 6 shows the results for a zero Oe longitudinal bias field.

While the present invention has been particularly shown and described with reference to preferred embodiments thereof, it will be understood by those skilled in the art that various changes in form and detail may be made therein without departing from the spirit, scope and teaching of the invention. For example, while the preferred embodiment shown is described as an unshielded device, the MR sensor of the present invention is equally applicable to a shielded or flux-guided structure. Accordingly, the invention herein disclosed is to be considered merely as illustrative and limited in scope only as specified in the appended claims.

We claim:

1. A magnetoresistive sensor comprising:
a first and a second layer of ferromagnetic material separated by a layer of non-magnetic metallic material, the magnetic easy axis in said first and second layers of ferromagnetic material being substantially parallel, the direction of magnetization of said first and second layers of ferromagnetic material responsive to a magnetic field generated by a sense current in said magnetoresistive sensor being oriented at equal and opposite angles with respect to said magnetic easy axis, respectively, the change in resistance of said magnetoresistive sensor responsive to an applied magnetic field being a function of the change in the angle between said directions of magnetization in said first and second layers of ferromagnetic material, the magnetization of each of said first and second layers of ferromagnetic material being responsive to said applied magnetic field.

2. A magnetoresistive sensor as in claim 1 wherein said first and second ferromagnetic layers are comprised of a ferromagnetic material selected from the group consisting of iron, cobalt, nickel and alloys of iron, cobalt or nickel.

3. A magnetoresistive sensor as in claim 2 wherein said first and second ferromagnetic layers are comprised of an alloy of nickel-iron.

4. A magnetoresistive sensor as in claim 1 wherein the magnetic easy axis for each of said first and second ferromagnetic layers aligned parallel with the longitudinal axis of said first and second ferromagnetic layers.

5. A magnetoresistive sensor as in claim 4 wherein the magnetic easy axis for each of said first and second ferromagnetic layers is aligned substantially perpendicular to the trackwidth of a data track defined on a magnetic storage medium.

6. A magnetoresistive sensor as in claim 1 wherein said first and second ferromagnetic layers and said nonmagnetic metallic layer form a multilayered magnetoresistive sensing element having a length and a width, said magnetoresistive sensing element being oriented such that the longitudinal axis thereof is substantially perpendicular to an air bearing surface of said magnetoresistive sensor.

7. A magnetoresistive sensor as in claim 6 wherein a lower end of said magnetoresistive sensing element is co-planar with said air bearing surface, said lower said end of said magnetoresistive sensing element being exposed at said air bearing surface.

8. A magnetoresistive sensor as in claim 7 wherein the magnetic easy axis for each of said first and second ferromagnetic layers is oriented substantially perpendicular to the trackwidth of a data track defined in a moving magnetic storage medium disposed adjacent said air bearing surface.

9. A magnetoresistive sensor as in claim 8 wherein said data track trackwidth is defined by the width of said magnetoresistive sensing element, said magnetoresistive sensing element oriented such that the width thereof extends across said datatrack parallel to said trackwidth.

10. A magnetoresistive sensor as in claim 6 further comprising a layer of electrical conductive material deposited over end regions of said magnetoresistive sensing element for coupling said magnetoresistive sensor to external circuitry, said end regions defining upper and lower ends of said magnetoresistive sensing element.

11. A magnetoresistive sensor as in claim 10 further comprising a bias layer deposited over the end region at said upper end of said magnetoresistive sensing element remote from said air bearing surface for providing a longitudinal bias field in said magnetoresistive sensing element.

12. A magnetoresistive sensor as in claim 11 wherein said bias layer comprises a layer of antiferromagnetic material deposited in direct contact with one of said ferromagnetic layers for providing said longitudinal bias field by antiferromagnetic-ferromagnetic exchange coupling.

13. A magnetoresistive sensor as in claim 12 wherein said bias layer comprises an antiferromagnetic material selected from the group consisting of iron-manganese and nickel-manganese.

14. A magnetoresistive sensor as in claim 11 wherein said bias layer comprises a layer of magnetically hard material for providing said longitudinal bias field.

15. A magnetoresistive sensor as in claim 1 wherein said first and second ferromagnetic layers have a thickness within the range of about 10 angstroms to about 150 angstroms.

16. A magnetoresistive sensor as in claim 1 wherein said non-magnetic metallic spacer layer has a thickness less than the mean free path length of conduction electrons in said non-magnetic metallic spacer layer.

17. A magnetoresistive sensor as in claim 16 wherein said non-magnetic metallic spacer layer has a thickness within the range of about 10 angstroms to about 40 angstroms.

18. A magnetoresistive sensor as in claim 1 where in said non-magnetic metallic spacer layer is comprised of a material selected from the group consisting of silver, gold, copper and alloys of silver, copper or gold.

19. A magnetoresistive sensor as in claim 18 wherein said non-magnetic metallic spacer layer comprises a thin film layer of copper.

20. A magnetoresistive sensor as in claim 1 further comprising a pair of conductive leads connected to said first and second ferromagnetic layers at first and second end portions thereof, said conductive leads for coupling said magnetoresistive sensor to external circuitry and coupling said sense current to said magnetoresistive sensor.

21. A magnetoresistive sensor as in claim 20 further comprising a bias conductor adjacent to said first and second ferromagnetic layers for providing a longitudinal bias field in said first and second ferromagnetic layers.

22. A magnetic storage system comprising:
a magnetic storage medium having a plurality of tracks for recording of data;
a magnetic transducer maintained in a closely spaced position relative to said magnetic storage medium during relative motion between said magnetic transducer and said magnetic storage medium, said magnetic transducer including a magnetoresistive sensor comprising:
a first and a second layer of ferromagnetic material separated by a layer of non-magnetic metallic material forming an magnetoresistive sensing element, the magnetic easy axis in said first and second ferromagnetic layers being substantially parallel, the direction of magnetization of said first and second ferromagnetic layers responsive to a magnetic field generated by a sense current in said magnetoresistive sensor being oriented at equal and opposite angles with respect to said magnetic easy axis, respectively, the change in resistance of said magnetoresistive sensor responsive to an applied magnetic field being a function of the change in the angle between said directions of magnetization in said first and second ferromagnetic layers, the magnetization of each of said first and second ferromagnetic layers being responsive to said applied magnetic field, said magnetoresistive sensing element being oriented such that the longitudinal axis thereof is perpendicular to the trackwidth of a data track defined in said magnetic storage medium, a lower end of said magnetoresistive sensing element facing said magnetic storage medium in spaced relationship;
conductive leads connected to said lower end and to an upper end of said magnetoresistive sensing element, respectively, for connecting said magnetoresistive sensor to external circuitry and for coupling said sense current to said magnetoresistive sensing element; and
bias means formed adjacent said magnetoresistive sensing element for providing a longitudinal bias field in said magnetoresistive sensing element;
actuator means coupled to said magnetic transducer for moving said magnetic transducer to selected data tracks on said magnetic storage medium; and
detection means coupled to said magnetoresistive sensor for detecting resistance changes in said magnetoresistive material responsive to applied magnetic fields representative of data bits recorded in said magnetic storage medium intercepted by said magnetoresistive sensor.

23. A magnetic storage system as in claim 22 wherein the magnetic easy axis for each of said first and second ferromagnetic layers is oriented substantially perpendicular to said data track trackwidth, said easy axis parallel to said magnetoresistive sensing element longitudinal axis.

24. A magnetic storage system as in claim 23 wherein said magnetic transducer includes an air bearing surface in facing relationship with said magnetic storage medium, said lower end of said magnetoresistive sensing element being co-planar with said air bearing surface, said lower said end of said magnetoresistive sensing element being exposed at said air bearing surface.

25. A magnetic storage system as in claim 24 wherein said data track trackwidth is defined by the width of said magnetoresistive sensing element, said magnetoresistive sensing element oriented such that the width thereof extends across said datatrack parallel to said trackwidth.

26. A magnetic storage system as in claim 24 wherein said bias means comprises a layer of antiferromagnetic material deposited in direct contact with one of said ferromagnetic layers over an end region defined at said upper end of said magnetoresistive sensing element for providing said longitudinal bias field by antiferromagnetic-ferromagnetic exchange coupling, said upper end remote from said air bearing surface.

27. A magnetic storage system as in claim 24 wherein said bias means comprises a layer of magnetically hard material deposited over an end region defined at said upper end of said magnetoresistive sensing element for providing said longitudinal bias field.

28. A magnetic storage system as in claim 22 wherein said bias means comprises a bias conductor adjacent to said first and second ferromagnetic layers for providing a longitudinal bias field in said first and second ferromagnetic layers.

* * * * *